Feb. 3, 1970   R. L. FERRIS ET AL   3,493,207
FIFTH WHEEL PLATE FOR FOLDABLE STANCHION
Original Filed April 20, 1966   8 Sheets-Sheet 1

INVENTORS
HERBERT S. WILLE
RAY L. FERRIS
BY Wayne Morris
ATTY.

Feb. 3, 1970

R. L. FERRIS ET AL 3,493,207

FIFTH WHEEL PLATE FOR FOLDABLE STANCHION

Original Filed April 20, 1966

INVENTORS
HERBERT S. WILLE
RAY L. FERRIS
BY Wayne Morris Russell
ATT'Y.

United States Patent Office 3,493,207
Patented Feb. 3, 1970

3,493,207
FIFTH WHEEL PLATE FOR FOLDABLE STANCHION
Ray L. Ferris, Thornton, and Herbert S. Wille, Homewood, Ill., assignors to Pullman Incorporated, Chicago, Ill., a corporation of Delaware
Original application Apr. 20, 1966, Ser. No. 543,991, now Patent No. 3,358,955, dated Dec. 19, 1967. Divided and this application Sept. 27, 1967, Ser. No. 671,047
Int. Cl. B60p 7/00
U.S. Cl. 248—119                                    1 Claim

ABSTRACT OF THE DISCLOSURE

The present invention provides a collapsible stanchion of the type having a fifth wheel plate carried by a right triangular support structure including an upright strut and a foldable diagonal strut for hitching a semi-trailer thereon and having a new and novel release mechanism which when actuated by an externally applied force is operative to release the semi-trailer from engagement with the stanchion. The release mechanism includes a rotatable kingpin locking jaw in the fifth wheel plate and a latch bar releasably engageable in a locking notch in the jaw member with a guided unlocking member movably associated with such bar and disposed to prevent re-entry of the latch bar into the locking notch.

---

It is an object to provide a stanchion of the foregoing described type with a new and novel releasing mechanism which is operative to release the kingpin locking jaw mechanism of the fifth wheel plate.

It is another object of the invention to provide an arrangement for releasing the kingpin locking means independently of a diagonal strut releasing mechanism.

It is a further object to provide a fail-safe kingpin releasing arrangement which is operative upon release of the kingpin locking jaw to prevent re-engagement of the locking jaw with the kingpin when the stanchion is being collapsed.

Further objects and features will hereinafter appear wherein the invention is related to stanchions of the type used in hitching a semi-trailer on a railway flat car and more particularly to a stanchion including a fifth wheel plate supported by an upright and a foldable diagonal strut, which when unfolded serves to maintain the stanchion in an erect operative semi-trailer hitching and supported position and when folded to a collapsed position adjacent the floor, permits the semi-trailer and a tractor employed to move the semi-trailer, to pass thereover.

This application is a division of application Ser. No. 543,991 filed Apr. 20, 1966 for Foldable Stanchion, now U.S. Patent No. 3,358,955.

Figures 1, 2, 7:
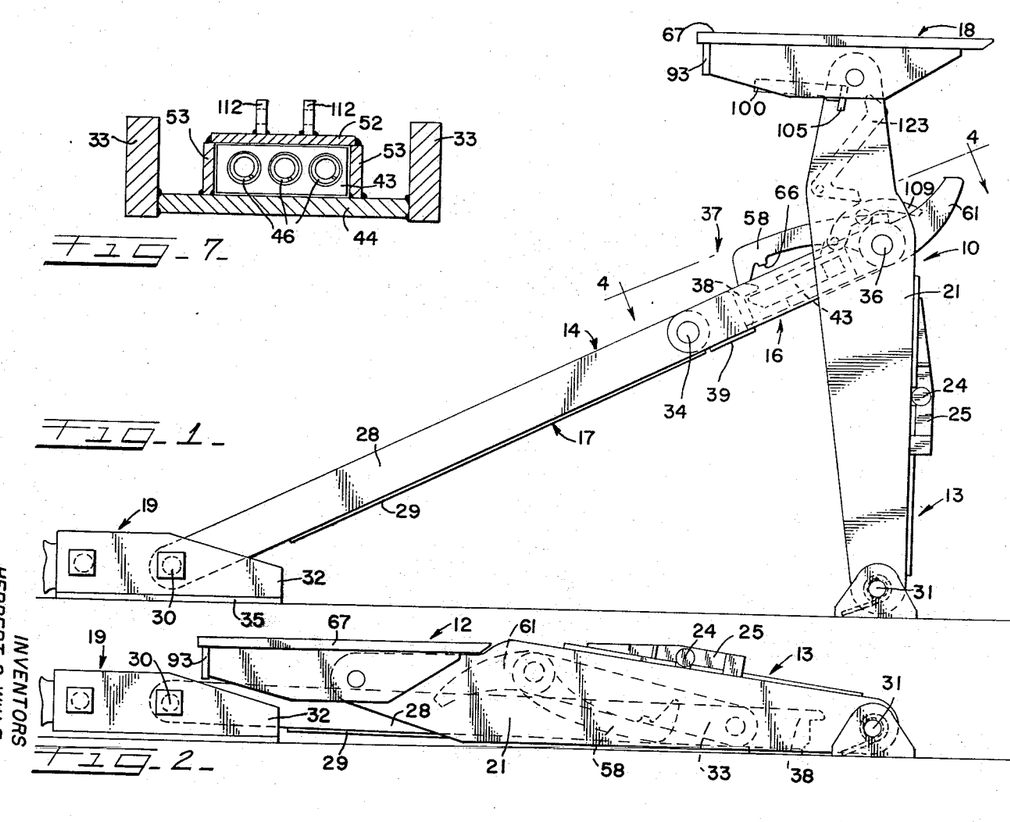
FIG. 1 is a side elevational view of the stanchion embodying the principles of the present invention.
FIG. 2 is a view similar to FIG. 1 but showing the stanchion in its collapsed or stored position.
FIG. 7 is a cross sectional view taken generally along the lines 7—7 of FIG. 4.
Figure 3:
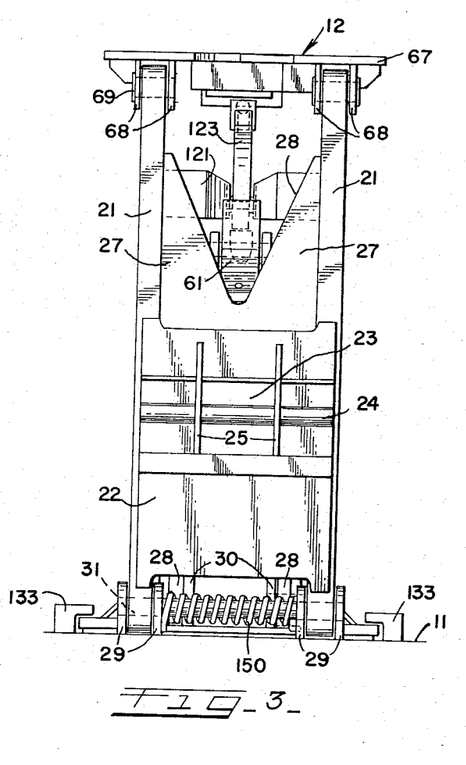
FIG. 3 is an end elevational view of the stanchion in its erect position.
Figure 4:
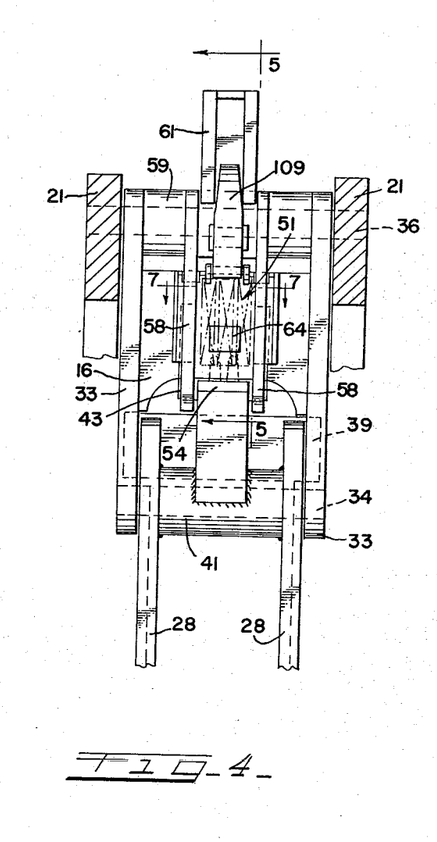
FIG. 4 is a fragmentary front elevational view of the stanchion showing the details of the diagonal strut latching mechanism taken generally along the lines 4—4 of FIG. 1.

Referring now to the drawings, in particular FIGS. 1 to 3, there is shown the stanchion 10 mounted on the floor 11 of a railway car for movement between an erect operative position as shown in FIG. 1 to a collapsed inoperative position on the floor as shown in FIG. 2. The stanchion 10 comprises generally an upright strut 13, a diagonal strut 14 including an upper diagonal strut member 16 and a lower diagonal strut member 17. Mounted on the vertical strut is a fifth wheel plate or hitching and support plate 18, which supports the underside of a trailer and engages the kingpin depending therefrom. Associated with the diagonal strut 14 may be a cushioning device 19 which serves to cushion the forces imposed on the stanchion during use.

As shown, the vertical strut 13 includes a pair of laterally spaced strut legs or members 21—21. Fixed and spanning the strut members 21 is a plate 22 which may be provided with an opening located substantially intermediate the strut members 21. Spanning the opening 23 is a rod 24 fixed at each end to the pair of upstanding brackets 25—25. The rod 24 spanning the opening 23 serves as a means for elevating the stanchion by way of a hook or the like which may be attached to a tractor or a crane. The manner in which the stanchion is elevated from its collapsed position shown in FIG. 2 to the erect position in FIG. 1 will be more fully explained hereinafter. A second plate 27 formed with a substantially V-shaped cut-out 28 may span the strut members 21—21 adjacent the upper ends of the latter to provide further reinforcement. The strut members 21—21 are each pivotally connected at their lower ends between a pair of bracket members 29—29, by way of pivot stud 31. The bracket members 29—29 are fixedly secured to base or floor 11.

Figure 16:
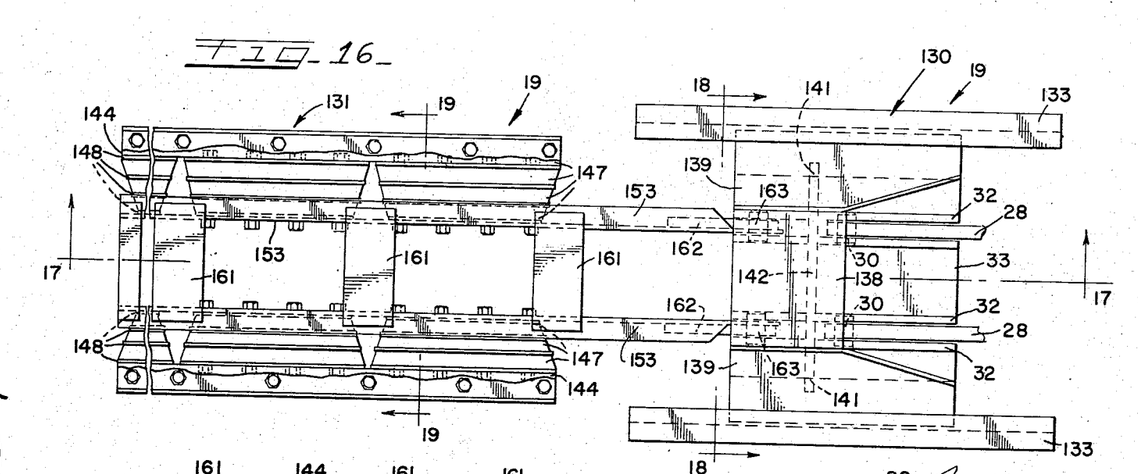
FIG. 16 is a plain view of the cushioning arrangement associated with the lower end of the diagonal strut member of the stanchion.
Figure 17:
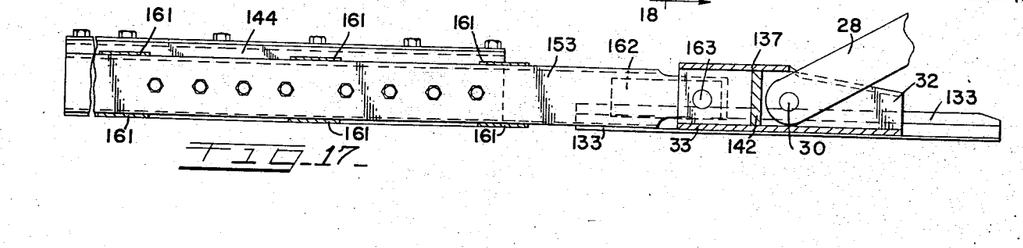
FIG. 17 is a cross sectional view of the cushioning arrangement cross head assembly taken generally along the lines 17—17 of FIG. 16.
Figure 18:
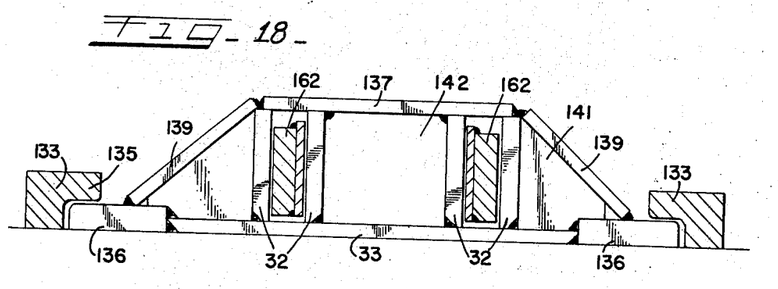
FIG. 18 is a cross sectional view of the cushioning device taken generally along the lines 18—18 of FIG. 16.
Figure 19:
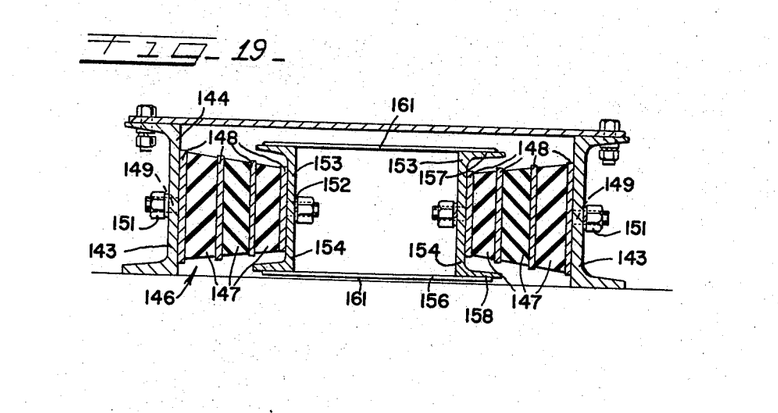
FIG. 19 is a cross sectional view taken generally along the lines 19—19 of FIG. 16.

The lower diagonal strut member 17 includes a pair of transversely spaced lower diagonal strut legs 28—28 of which the lower ends are each pivotally connected by way of pivot pins 30 to upstanding trunnion plates 32—32 fixed to a slide plate 35 of the cushioning arrangement 19 as shown in particular in FIGS. 16 and 17. If desired, the legs 28—28 may be connected to similar trunnions fixed to the floor if a cushioning arrangement is not used. Spanning the legs 28—28 adjacent the upper ends thereof and projecting outwardly thereof is a stop plate 39.

The upper diagonal strut member 16 includes a pair of transversely spaced upper diagonal strut legs 33—33 spaced, as shown, to overlie the respective upper ends of the lower diagonal strut legs 28—28 and are pivotally connected thereto at a point disposed below the terminal ends of the legs 28—28 by a pivot shaft 34. The upper ends of the legs 33—33 are confined within the upright strut members 21—21 and pivotally connected thereto at a point disposed below the upper ends of the latter by means of a pivot shaft 36. With the diagonal strut 14 constructed as described above, including the upper diagonal strut 16 pivotally connected to the upright strut 13 and to the lower diagonal strut 17 and pivotally connected to the brackets 32 on the floor 11, in the collapsed position as shown in FIG. 2, the upper diagonal strut 16 overlies the lower diagonal strut 17 and are nested in stored position within the confines of the upright strut members 21—21. Upon applying a pulling force to the upright strut 13 as by the engagement of a hook on the rod 24, the upright strut 13 is rotated about the pivot studs 31 to the upright position shown in FIG. 1, whereupon the upper diagonal strut member 16 is unfolded with respect to the lower diagonal strut 17 until the former engages the projecting ends of the brace 39 to prevent further turning and to assume a substantially linear diagonal position.

For holding the upper and lower diagonal struts 16 and 17 in linear diagonal position and thereby locking the stanchion 10 in its erect operating position, there is provided a latching mechanism 37 as shown in particular in FIGS. 1 and 4–7. The latching mechanism 37 includes generally a keeper member 38 which is fixed along its bottom face to a web 39 spanning the lower diagonal strut members 28—28. At its rear end the keeper 38 is fixed to the journal sleeve 41 fixed between the legs 28—28 and turnably receiving therein the pivot stud 34. The keeper 38 is formed with a projecting lip 42 which projects outwardly of the terminal ends of the strut members 28—28.

Engageable beneath the lip 42 is a slidable latch plate 43 mounted on the upper diagonal strut member 16. The latch plate 43 slides along its base on a plate 44 fixed between the upper diagonal strut legs 33—33 and terminating at its lower end along a line displaced from the terminal ends of the lower diagonal strut legs 28—28. Biasing the latch plate 43 into engagement below the lip 42 are a plurality of biasing springs 46 as shown in particular in FIGS. 5–7. Each of the springs 46 at one end thereof are disposed within respective openings 47 formed in the upper end of the latch plate 43 and at the other end abut against a vertical back plate 49 of a housing 51. The housing 51 includes a top plate 52 fixed at its rear end to the vertical back plate 49 and along its side edges to longitudinally extending side walls 53. The side walls 53 and top wall 52 guide the latch plate 43 for longitudinal lengthwise movement of the upper diagonal strut 16. Limiting the movement of the latch plate 43 against the force of the biasing springs 46 are stop pins 40 projecting upwardly from the plate 44 into open-end slots 45 formed on the underside of the latch plate 43 and engageable with a closed end wall 50.

Figure 5:
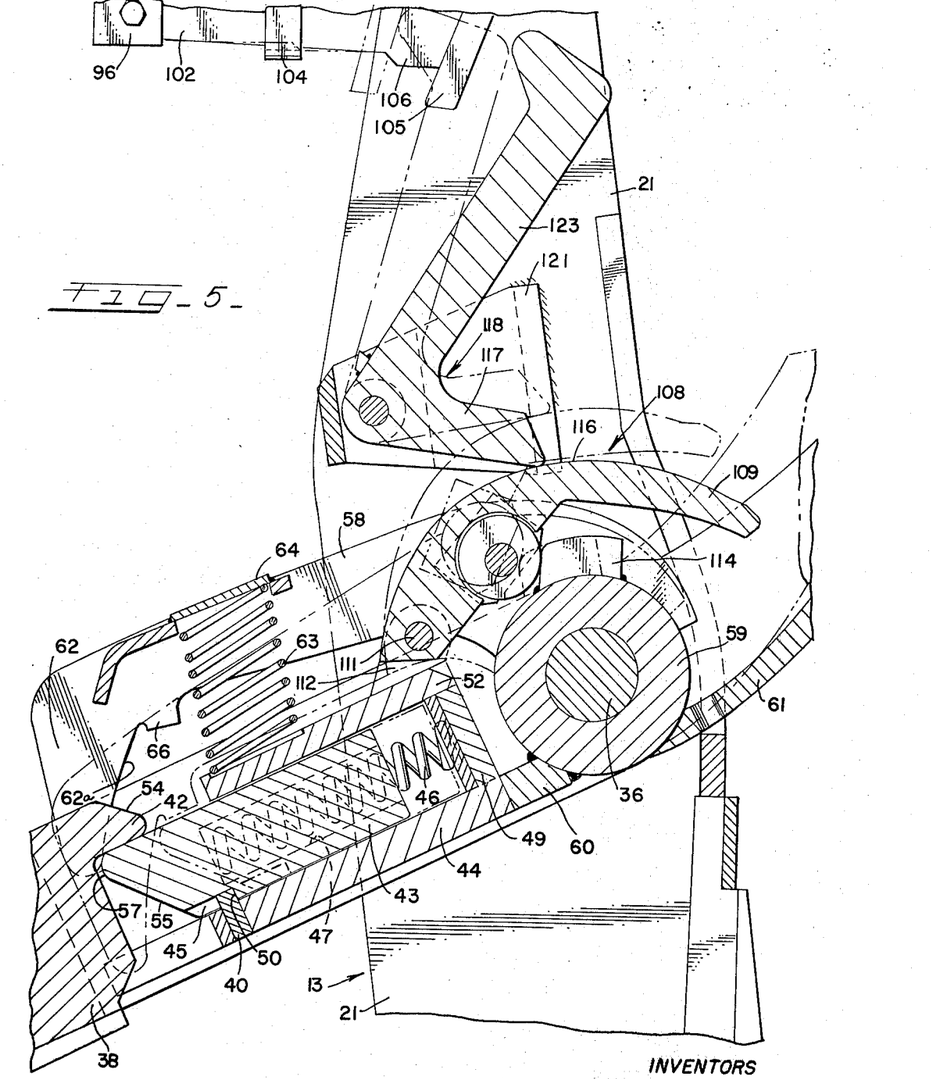
FIG. 5 is a cross sectional view taken generally along the lines 5—5 of the FIG. 4 and showing details of the diagonal strut latch and kingpin latch release mechanism of the present invention.
Figure 6:
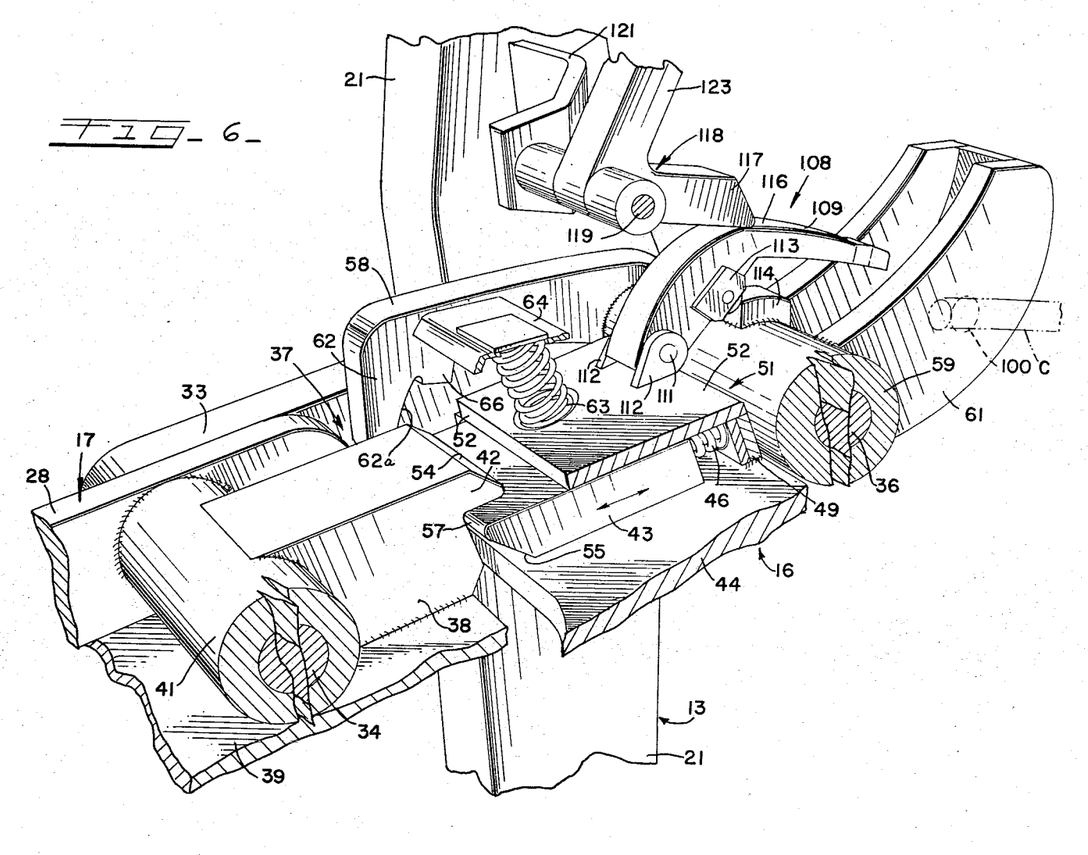
FIG. 6 is a fragmentary perspective view similar to FIG. 5 showing in particular the diagonal strut and kingpin latch release mechanism.

As shown, in particular in FIGS. 5 and 6, the upper side of the lip 42 is formed with an inclined surface 54 which is complementary to an inclined surface 55 formed on the underside of the latch plate 43. Thus, when the upper diagonal strut folds clockwise as viewed in FIG. 6 relative to the lower diagonal strut 17 and the two struts approach the linear position, the inclined surface 55 engages the keeper inclined surface 54 so as to force the latch plate 43 rearwardly against the force of the biasing springs 46. When the upper diagonal strut 16 and the stop plate 39 on the lower diagonal strut engage to assume the linear position, the latch plate 43 is forced downwardly by the springs 46 and into engagement with the underside of the lip 42, thereby to prevent turning in a counterclockwise direction and maintain the diagonal strut members 16 and 17 in the rigid linear position and the stanchion 10 in its erect operative position. It is to be noted that the latch plate 43 is of greater width than the keeper 42 so as to provide laterally projecting latch plate ends 57—57 on either side of the keeper 54.

To retract the latch plate 43 out of engagement with the keeper 42 to permit collapsing of the stanchion 10, there is provided a pair of pawls 58 fixed to a cylindrical sleeve 59 turnably mounted on the pivot shaft 36. Extending from the cylindrical sleeve 59 is an actuator lever 61 which, as shown, is of substantially arcuate shape and is adapted to be engaged by the tractor so as to turn the sleeve 59 about the pivot shaft 36. Upon turning movement of the sleeve 59, the pawls 58—58 fixed thereto are depressed downwardly or counterclockwise as shown in FIGS. 5 and 6. Upon turning movement downwardly the hook ends 62 of the pawls contact the laterally projecting ends 57—57 of the slidable latch plate 43 whereupon a camming surface 62a formed on the underside of the hook ends 62 engages the latch plate leading edge to retract the latch plate 43 against the force of the springs 46. Upon depression of the springs 46 the latch plate 43 is moved out of engagement with the lip 42 of the keeper, whereby the upper strut 16 is free to turn counterclockwise relative to the lower diagonal strut member 17.

The actuating lever 61 is resiliently held in a force receiving position extending outwardly of the upstanding strut 13 by means of a compression spring 63, which is disposed between the top of the housing plate 52 and a cross bar 64 which is fixed at each of its ends to the inner face of the pawls 58—58. Retaining the actuating lever 61 in the force receiving position is a stop 60 fixed to the sleeve 59 and abuttable against the housing end wall 49. Thus, the compression spring acting between the plate 52 and the cross plate 64 is operative to normally apply an upward force on the pawls 58—58 whereby the sleeve 59 fixed to the pawls is yieldably rotated about the shaft 36 until the stop 60 abuts the end wall 49 thereby to position the actuating lever 61 in its force receiving position as shown, for example, in FIG. 5.

It is to be particularly noted that the pawls 58—58 are formed with a substantially flat abutment surface 66, which when the pawls 58—58 are in the downward position retracting the latch plate 43, as shown in phantom, engage the upper side of the latch plate 43. Thus, the force imposed on the actuating lever 61 is transmitted by way of the projections 66—66 to the upper diagonal strut 16 so as to assist in providing a downward force or turning moment about the pivot shaft 34 to assist in collapsing the stanchion 10.

The fifth wheel plate or hitching and support plate 12, as shown in particular in FIGS. 8-14, comprises generally a top plate 67 from the underside of which there depend a pair of brackets 68—68 which embrace the respective upright leg members 21—21. Pivotally connecting the leg members 21—21 to the brackets 68—68 are pivot pins 69.

Figure 8:
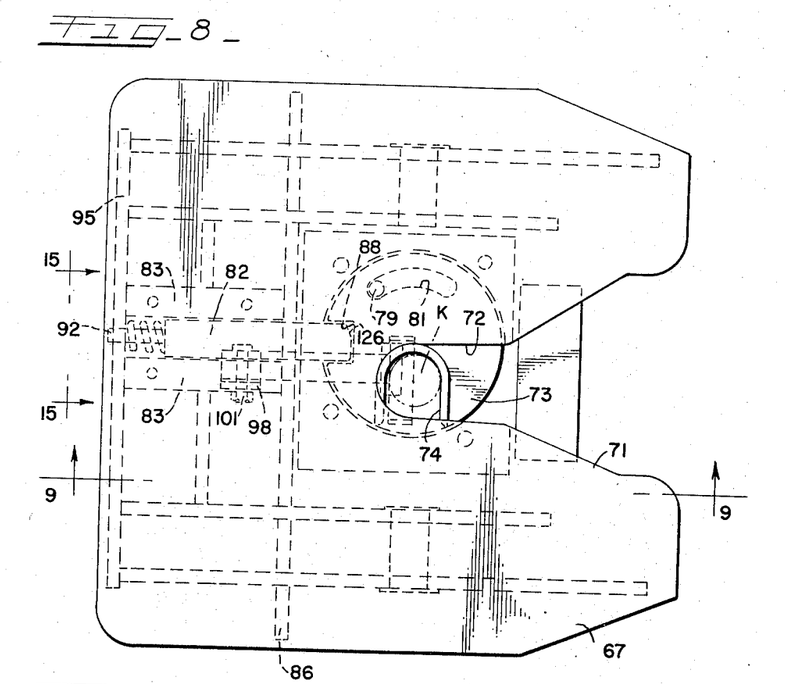
FIG. 8 is a top plan view of the fifth wheel plate of the present invention.

The leading edge of the top plate 67 is formed with a substantially V-shaped notched opening 71 terminating in a U-shaped guiding opening 72. Disposed below the U-shaped opening 72 is a kingpin locking jaw 73 of generally circular configuration having a U-shaped kingpin receiving notch 74 formed therein. The locking jaw is turnably or rotatably supported within a housing generally designated as 75 and including base plate 76 attached as by bolts across the base of a block 77 fixed to the underside of the top plate 67 and formed with a circular opening 78 adapted to receive the generally circular locking jaw 73 therein. The block 77 and base plate 76 are provided similarly to the top plate 71 with a U-shaped opening 72a to receive the kingpin K depending from the underside of the semi-trailer.

Figures 11, 12, 13, 14:
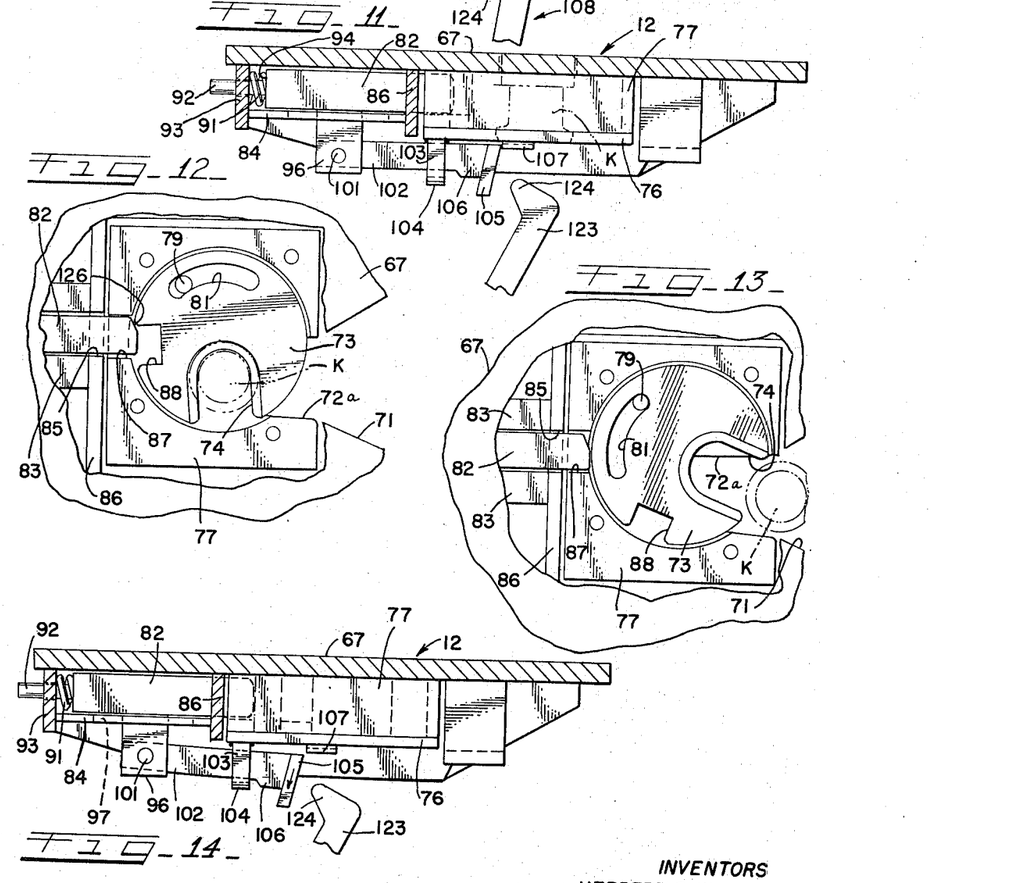
FIG. 11 is similar to FIG. 9 but showing relative positions of the releasing mechanisms and the locking jaw arrangement under conditions in which the force being applied is removed during the initial collapsing movement of the stanchion and prior to the detachment of the trailer kingpin from the locking jaw.
FIG. 12 is a fragmentary plan view showing the relative position of the kingpin locking jaw and the locking jaw latching arrangement in a position corresponding to that shown in FIG. 11.
FIG. 13 similar to FIG. 12 but showing the position of the kingpin locking jaw and the locking jaw latching arrangement in a position corresponding to FIG. 14.
FIG. 14 is similar to FIGS. 10 and 11 but showing the relative positions of the locking jaw release arrangement and the locking jaw of the diagonal strut when the stanchion approaches its fully collapsed position and the kingpin is detached from the locking jaw.

The locking jaw 73 is turnable from a kingpin receiving position as shown in FIG. 13 to a locked position shown in FIG. 8. Limiting the turning movement of the locking jaw 73 is a pin 79 received within an arcuate slot 81 formed in the locking jaw 73. The pin 79 is suitably fixed to the base plate 76 as by force fit or threaded therein. Upon engagement of the kingpin K within the locking jaw opening 74, the locking jaw 73 is turned to the locked position as shown in FIGS. 8 and 9.

Holding the locking jaw 73 in the kingpin locked position is a latching arrangement generally designated as 80 and including a latch bar 82 slidably supported between a pair of depending side plates 83—83 fixed to the underside of the top plate 67. Vertically supporting the latch bar 82 is a base plate 84 fixed to the side plates 83—83. The latch bar 82 extends through an opening 85 formed in the transversely extending reinforcing plate 86 fixed to the underside of the top plate 67 and an aligned opening 87 in the block 77. The leading edge of the latch bar 82 is received within a notch 88 formed in the locking jaw 73 when the two are aligned in the locked position of the locking jaw 73. Biasing the latching bar 82 into engagement with the notch 88 is a spring 91 which is disposed about a reduced end 92 and engageable between a rear plate 93 and the shoulder 94 on the latch bar 82. As shown, the reduced end 92 extends through an opening formed in the rear plate 93.

Figures 9, 15:
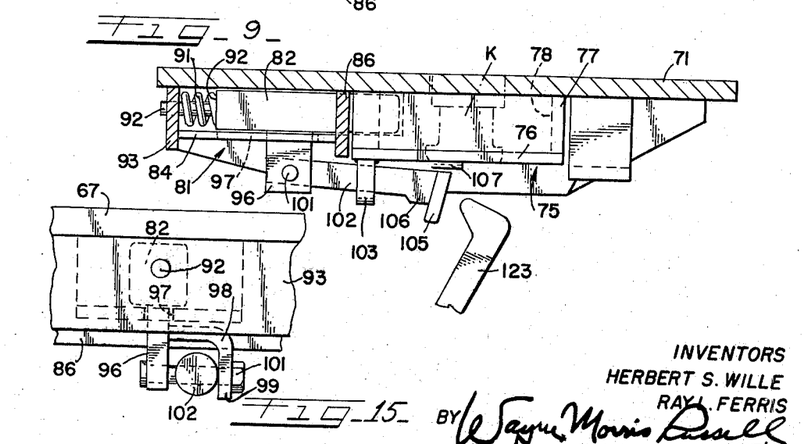
FIG. 9 is a cross sectional view through the fifth wheel plate taken generally along the lines 9—9 and showing the relative positions of the kingpin locking jaw latch and releasing mechanism therefor in the kingpin locked position.
FIG. 15 is a fragmentary end elevational view of the kingpin locking jaw arrangement taken generally along the lines 15 of FIG. 8.

For releasing the latch bar 82 from engagement with the notch 88 in the locking jaw 73 to permit rotation thereof, there is attached to the underside of the latch bar 83 a downwardly depending plate 96 which extends through an elongate slot 97 formed in the plate 84, as shown in FIG. 15. Extending from one side of the plate 96 is an angle plate 98 having a downwardly depending flange 99 parallel to the plate 96. Supported between the flange 99 and plates 96 is a pivot pin 101 on which there is pivotally mounted one end of an unlocking bar 102. The unlocking bar 102 is of substantially circular cross section and extends forwardly toward the leading edge of the fifth wheel plate. At its forward end the unlocking bar 102 is supported in a substantially U-shaped strap 103 having a bight portion 104 which is adapted to be engaged by a downwardly depending camming portion 106 formed on the unlocking bar 102, as more fully to be explained hereinafter. Also associated with the unlocking bar 102 is a stop plate 107 which is fixed to the underside of the kingpin base plate 76 spaced toward the leading edge of the top plate and forwardly of the unlocking bar 102. The forward edge of the unlocking bar has fixed thereto an inclined abutment plate 105 adapted to engage or to be engaged with the locking jaw release mechanism 108.

The locking jaw release mechanism in the embodiment shown is associated with the diagonal strut or latch mechanism 37. The latch release mechanism comprises generally, as shown in particular in FIGS. 5 and 6 and 10 through 15, a camming lever 109 which is pivotally connected by way of a pivot pin 111 to the transversely spaced brackets 112 fixed to the upper side of the top plate 52 of the latch plate housing 51. Mounted on the camming lever 109 is a roller cam assembly 113 which engages a cam 114 provided on the sleeve 59. Upon rotation of the sleeve 59 by the application of force to the torque lever 61, the cam 114 in engagement with the cam 113 on the camming lever 109 is operative to displace the latter upwardly and counterclockwise about the pivot 111.

Engaging an arcuate camming surface 116 formed on the upper side of the camming lever 109 so as to be actuated thereby is a lever arm 117 of a rock lever 118. The rock lever 118 is pivotally mounted on a shaft 119 supported between a pair of brackets 121 fixed in the inner faces of the legs 21—21. The other end of the rock lever 118 is provided with a lever arm 123 terminating in a nose-like projection 124, which engages the inclined plate 105 of the unlocking bar 102 when the rock lever 118 is turned about the pivot shaft 119 upon counterclockwise movement of the camming lever 109.

Figure 10:
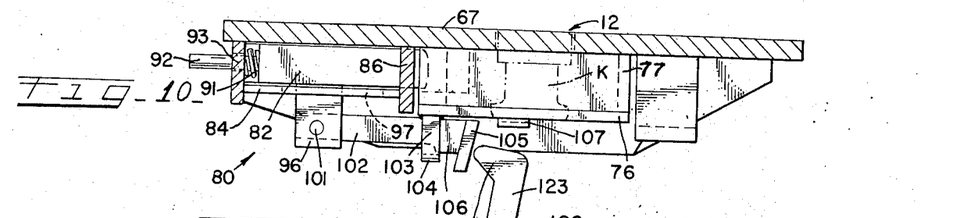
FIG. 10 is a view similar to FIG. 9 but showing the relative positions of the releasing mechanism and the locking jaw latching device prior to complete release of the kingpin from the locking jaw.

As shown for example in FIG. 9 in the kingpin locked position, the latch bar 82 is seated within locking jaw notch 88 and the unlocking bar 102 is inclined downwardly with the projecting end 124 of the rock lever arm 123 displaced therefrom. Upon upward movement of the camming lever 109, the rock lever 118 by way of engagement of the arm 117 with the camming lever 109 is rocked counterclockwise as viewed in FIG. 6 so that the nose-like projection 124 engages the inclined plate 105 as shown in FIG. 10 and causes the unlocking bar 102 to rock about the pivot pin 101 and assume a substantially horizontal position and held therein by way of engagement of the camming projection 106 with the bight 104 of the strap 103. At the same time the latch bar 82 and the unlocking bar 102 are moved rearwardly against the force of the biasing spring 91.

The conditions of the force being applied to the torque lever 61 may be such that it may be temporarily released, whereupon the camming arm 109 would reverse rearwardly or clockwise so that the rock lever 118 and the nose-like end 124 would be similarly displaced away from inclined plate 105 and no longer apply a force thereto as shown in FIG. 11. Should this condition occur, the latch bar 82 under the influence of the spring 91 moves forwardly or toward the leading edge of the kingpin plate so as to re-engage within the locking jaw notch 88 thereby preventing the release of the kingpin. In accordance with the arrangement as shown in FIG. 11, the re-engagement is prevented because as the spring 91 forces the latching bar 82 forwardly and thereby the horizontally disposed unlocking bar 102 therewith, the upper edge of the plate 105 engages the stop plate 107, thereby preventing the complete re-engagement of the latching bar 82 with the notch 88 as shown in FIG. 12. In this manner the locking jaw 73 remains freely rotatable so as to permit disengagement of the kingpin therewith. To this end the latching bar 82 is formed with an inclined surface 126 so that as the locking jaw 73 is rotated by way of the force applied by the kingpin K of the stationary trailer, the latching bar 82 is forced rearwardly against the force of the spring 91 whereupon the unlocking bar 102 and the inclined surface 105 are displaced away from the stop block 107. Under these conditions the unlocking bar 102 is free to turn about the pivot pin 101 and drop out of alignment with the stop block 107 as shown in FIG. 14. Thus, there is provided a fail-safe kingpin unlocking arrangement.

When the stanchion 10 is associated with a cushioning arrangement, as more fully to be described hereinafter, the upright strut 13 swings about the pivot studs 31. In this connection it is to be noted that the force receiving member 61 and the pawl 58 are each fixed to the cylindrical sleeve 59 journal on the pivot shaft 36 connecting the upper diagonal strut 16 to the upright strut 13. Thus, the actuating arm 61 and the pawl 58, and the upper diagonal strut 17, move as a unit during the swinging movement of the upright strut and retain the same relative positions.

At the same time the camming lever 108 fixed to the housing 51 retains its position in engagement with the camming block 114. However, the rock lever 118 is connected to the upright strut 13 so that the lever or follower arm 117 moves relatively to the camming lever 109. To preclude rocking movement of the rock lever 118 and thereby inadvertent release of the locking jaw, the camming surface 116 is formed to provide a substantially constant dwell. In the form shown this is accomplished by the forming of the camming surface on a substantially constant radius.

Under some circumstances it may be desired to release the locking jaw and the kingpin engaged thereby independently of the diagonal strut releasing mechanism so that the stanchion 10 remains erect even though the kingpin is released. This is particularly desirable when the semi-trailers are unloaded by means of cranes or the like wherein the semi-trailers are lifted from the cars. To this end, it is possible to utilize a force applied directly upon the unlocking bar 102 at the inclined surface so as to force the latch bar 82 rearwardly against the force of the spring 91 until the camming portion 106 rests on the bight 104. Thereafter, the force of the spring 91 is operative to engage the upper end of the inclined plate 105 with the stop plate 107 as shown in FIG. 11 so that the latching bar 82 is held retracted out of the notch 88. The semi-trailer is then moved longitudinally so that kingpin K depending from the underside thereof applies a force on the locking jaw 73 to rotate the same to the release position shown in FIG. 13.

To collapse the stanchion 10 when a crane loading procedure is used for semi-trailer handling on the railway car, there is provided means for manually actuating the release of the diagonal strut latch mechanism. This is accomplished by the appliaction of a force manually applied to the actuating lever 61. To this end there is provided an opening 100 which is adapted to detachably receive one end of a crow bar C or the like on which the operator applies a force sufficient to overcome the resisting force of the springs 46 upon engagement of the pawls 58 with the leading edge of the latch plate 43 as heretofore explained.

Referring now again to the method for operating the stanchion by way of the tractor employed to load and unload the semi-trailer from the railway car, the tractor and semi-trailer hitched thereto are backed on to the car until the kingpin on the trailer is located somewhat to the right of the fifth wheel plate 12 as viewed in FIG. 2. The trailer brakes are then set and the conventional tractor fifth wheel plate is raised to elevate the front or kingpin end of the trailer. The kingpin is released from the tractor fifth wheel plate. A hook extending from the rear end of the stanchion is applied on to the bar 25 and the tractor moved forward slowly so as to pull the stanchion to its upright position, in which position it is locked rigid as heretofore described.

With the stanchion in the erect position shown in FIG. 1, the trailer still supported on the tractor fifth wheel plate is lowered so as to be supported on the stanchion fifth wheel and the tractor is backed sufficiently to release and retract the hook from the bar 25. The tractor is then driven forwardly and the tractor fifth wheel plate is inclined at an angle to engage the leading edge of the trailer. The trailer is now almost entirely supported by the stanchion 10.

Thereafter, the trailer brakes are released and the trailer pushed rearwardly by means of the inclined tractor fifth wheel plate. At this time the kingpin K depending from the underside of the trailer is guided through the openings 71 and 72–72a into engagement with the locking jaw 73 as shown in FIG. 13. Continued rearward movement of the kingpin K causes the rotation of the locking jaw 73 to the position shown in FIGS. 8 and 9 in which position the locking jaw is automatically seated by the latch bar 82 within the notch 88. The gladhands are then disconnected and the tractor is then completely released from the trailer in the usual manner and driven off the car.

Unloading of the semi-trailer is accomplished by backing the tractor on to the car and connecting the gladhands to the semi-trailer. The brakes on the trailer are then set. Thereafter, the tractor is backed until an abutment plate thereon engages the actuating lever 61, whereupon the diagonal strut releasing mechanism is actuated to retract the latch plate 43 out of engagement with the keeper 38 whereby the upper and lower diagonal struts are free to fold and permit the stanchion 10 to collapse. Also, the kingpin locking jaw 73 is released, preferably shortly after release of the latch plate 43. To minimize the impact of the free falling stanchion 10 on the floor 11, there may be provided a coil spring 150 disposed about a tube 151 carried on the inner projecting ends of the pivot studs 30 pivotally supporting the upright strut 13. One end of the spring 150 is engageable with the floor and the other end with the inner side of one of the upright strut legs 21 so that upon counterclockwise movement thereof as viewed in FIG. 1 the coil spring 150 is operative to apply a resisting force which acts in the nature of a cushion to reduce the impact of the stanchion 10 on the floor.

As heretofore described, the diagonal strut legs 28—28 pivotally connected by way of pivot pins 30 to trunnion brackets 32—32 mounted on the cushioning assembly 19 which is constructed and arranged to permit limited longitudinal travel of the support plate 12 and thereby reduce the operational forces imposed thereon by the kingpin depending from the underside of the trailer. In the embodiment shown in particular in FIGS. 16–19 the cushioning assembly 19 may comprise a crosshead assembly 130 and a resilient cushioning arrangement 131 permitting longitudinal movement. It is of course to be understood that various other types of cushioning arrangements such as hydraulic friction, or a combination of hydraulic, resilient and friction may also be used.

The crosshead assembly 130 comprises generally the base plate 35 to which the upstanding trunnion brackets 32 are secured as by welding. Fixed to the longitudinal edges of the base plate 35 are guiding plates 136—136 which underlie the horizontal flange 135 of guide blocks 133 fixed to the floor of the railway car.

As shown, in particular in FIG. 16, the trunnion plates 32—32 extend rearwardly of the pivot pin 30. Fixed across the rear portion of the plates 32 is a reinforcing cover plate 137. Further reinforcing the trunnion plates 32—32 are diagonally disposed plates 139 extending and fixed between the guide plates 136 and the longitudinal edges of the cover plate 137. Suitably transverse bracing may be provided by plates 141 and 142.

The cushioning arrangement 131 includes a pair of transversely spaced channel members 143 which are suitably secured to the car floor as by welding. Fixed to the vertical web 144 of each of the channel members 143 are a plurality of resilient cushion units 146 which are adapted to resiliently resist lengthwise movement in shear, as more fully to be explained hereinafter.

The cushioning units 146 each comprise a plurality of superposed resilient pads 147 formed of rubber or the like. The resilient pads 147 are separated by metallic separating plates 148 to which the adjacent faces are fixed as by bonding with a suitable adhesive. In the embodiment shown the outboard plates 148 are each provided with bolts 149 which extend through complementary spaced openings provided in the vertical web 144. Threading on the ends of the bolts 149 are nuts 151 which fix the units to the vertical web 144. On the inboard plate 148, a bolt 149 passes through complementary openings formed in the vertical web 153 of a channel member 154 of a crosshead connecting member 156.

The connecting member 156, as shown, comprises a pair of transversely spaced channel members 154—154 connected across the upper and lower flanges 157, 158, respectively, by lengthwise spaced transversely extending plates 161. Connected to the forward end of each of the channel members 154—154 is an attachment plate 162 which is fixed as by welding to the respective vertical webs 153. The connecting plates 162 are each fixed to the respective upstanding trunnion brackets 32 by way of a pin 163 so that lengthwise movement of the base plate 35 is resisted by the resilient cushion units 146.

Upon the imposition of a force on the fifth wheel plate 12 of the stanchion 10, as caused by impact to the railway car resulting in relative movement of the semi-trailer and the car, the force at kingpin captured within the locking jaw 73 is transmitted to the base plate 35 by way of the connection of the lower diagonal strut legs 28—28 to the trunnion brackets 32—32 fixed to the slidable plate 35. The plate 35 is therefore moved in the direction of the application of the force thereby causing the crosshead connecting member 156 attached thereto to move in the same direction. The cushioning units or rubber blocks 146 which are fixed to the movable connecting member 156 and to the channels 124 fixed to the car floor 11 are then stretched in shear plane. In this manner the rubber blocks 146 are operative to dissipate or absorb a portion of the impact forces and thereby reduce the force level on the fifth wheel plate assembly 12.

What is claimed is:

1. A fifth wheel plate assembly for attachment to a stanchion support structure, said assembly comprising a fifth wheel plate, a locking jaw, means mounting said locking jaw on said fifth wheel plate for turning movement between a kingpin receiving position and a kingpin lock position, a locking notch in said locking jaw, latch bar means mounted on said fifth wheel plate for horizontal movement and into and out of engagement with said locking notch, said latch bar having an inclined end surface for engagement with a portion of said locking notch to urge said unlocking means out of engagement with said stop means upon turning movement of said locking jaw to said kingpin receiving position so that said unlocking bar is turned to a position out of alignment with said stop means, spring means biasing said latch bar into said locking notch when said locking jaw is in said kingpin locked position, an unlocking means pivotally connected to said latch bar for operation therewith during said horizontal movement, means guiding said unlocking means for movement in a direction opposing the biasing force of said spring, horizontally opposed stop means, and cooperating means on said unlocking means and said guide means for elevating said unlocking means into alignment with said stop means during said horizontal movement, said stop means being disposed so as to prevent reverse horizontal movement of said unlocking bar and the reentry of said latch bar means into said locking notch.

References Cited

UNITED STATES PATENTS

| | | | |
|---|---|---|---|
| 3,225,707 | 12/1965 | Rollins et al. | |
| 1,981,233 | 11/1934 | Harris | 280—434 |
| 1,991,507 | 2/1935 | Ketel | 280—434 |
| 2,144,243 | 1/1939 | Fraser et al. | 280—434 |
| 2,833,558 | 5/1958 | Fenster | 280—434 |
| 2,861,818 | 11/1958 | Kayler et al. | 280—434 |
| 3,164,346 | 1/1965 | Bateson. | |
| 3,181,480 | 5/1965 | Sherrie et al. | |
| 3,190,595 | 6/1965 | Ferris. | |
| 3,314,691 | 4/1967 | Georgi | 280—434 |

FRANCIS K. ZUGEL, Primary Examiner

U.S. Cl. X.R.

105—368; 280—434